United States Patent [19]

Schaefer

[11] Patent Number: 5,162,145
[45] Date of Patent: Nov. 10, 1992

[54] GLAZING WITH FILTERING BAND AND PROCESS FOR PRODUCTION

[75] Inventor: Wolfgang Schaefer, Aachen, Fed. Rep. of Germany

[73] Assignee: Saint-Gobain Vitrage International, Courbevoie, France

[21] Appl. No.: 514,241

[22] Filed: Apr. 25, 1990

[30] Foreign Application Priority Data

May 3, 1989 [FR] France .................. 89 05861

[51] Int. Cl.$^5$ ............................................. B32B 17/10
[52] U.S. Cl. ..................................... 428/209; 428/34;
428/210; 428/336; 428/425.6; 428/425.8;
428/426; 428/432; 428/434; 428/437; 428/472;
428/701
[58] Field of Search ............... 428/209, 210, 34, 434,
428/432, 336, 426, 437, 457, 472, 701, 195, 699,
425.6, 425.8, 425.9; 427/163, 164, 407.2, 419.2,
419.4, 419.5, 165, 226, 282

[56] References Cited

U.S. PATENT DOCUMENTS

| Re. 25,711 | 1/1965 | Gaiser | 428/210 |
|---|---|---|---|
| 3,078,693 | 2/1963 | Lyytle | 428/210 |
| 3,652,370 | 3/1972 | Motai | 428/46 |
| 3,979,548 | 9/1976 | Schäfer | 428/425.6 |
| 4,129,671 | 12/1978 | Greenberg | 428/210 |
| 4,226,910 | 10/1980 | Dahlen | 428/336 |
| 4,232,080 | 11/1980 | Oràin | 428/437 |
| 4,244,997 | 1/1981 | Postupak | 428/210 |
| 4,268,545 | 5/1981 | Hodulik | 427/282 |
| 4,300,933 | 11/1981 | Thomas | 427/282 |
| 4,487,197 | 12/1984 | Hoyois | 428/433 |
| 4,623,582 | 11/1986 | Hasegawa et al. | 428/209 |
| 4,643,944 | 2/1987 | Agethen | 428/423.3 |
| 4,710,426 | 12/1987 | Stephens | 428/336 |
| 4,743,741 | 5/1988 | Ramus | 428/209 |
| 4,744,844 | 5/1988 | Hurst | 156/101 |
| 4,786,784 | 11/1988 | Kodem et al. | 427/165 |
| 4,810,583 | 3/1989 | Brown | 428/425.6 |
| 4,910,071 | 3/1990 | Kunert | 428/210 |
| 4,959,270 | 9/1990 | Hasegawa et al. | 428/432 |
| 4,971,848 | 11/1990 | Ruelle et al. | 428/209 |

FOREIGN PATENT DOCUMENTS

0033331 8/1981 Japan .
925171 5/1963 United Kingdom .

*Primary Examiner*—Ellis P. Robinson
*Assistant Examiner*—Archene Turner
*Attorney, Agent, or Firm*—Oblon, Spivak, McClelland, Maier & Neustadt

[57] ABSTRACT

A glazing for motor vehicles is provided with at least one zone, in particular in the form of a filtering band attenuating the light radiation and the heat radiation in the upper area of the glazing. The filtering band is made with a transparent coating of a bakable enamel, which contains at least one nobel metal present in colloidal dispersion. The coating has a constant layer thickness, is applied by silk-screening and exhibits a geometrically exact screening on its entire surface. The degree of coverage of the screen is 85-95% in the area close to the edge.

15 Claims, 3 Drawing Sheets

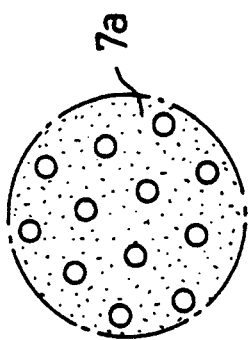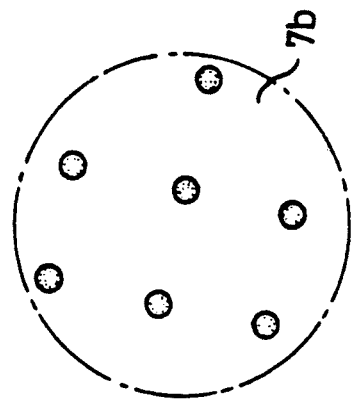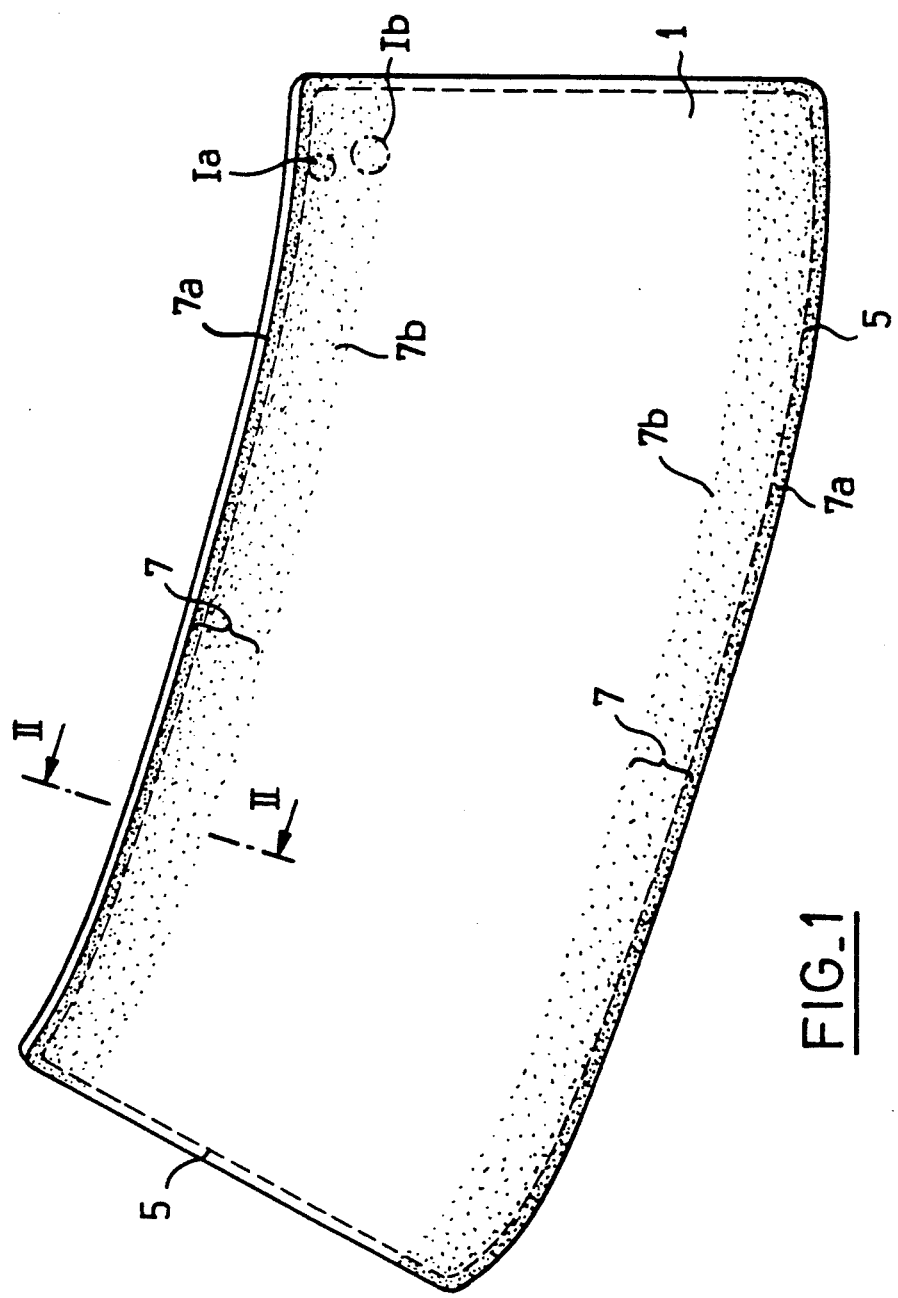

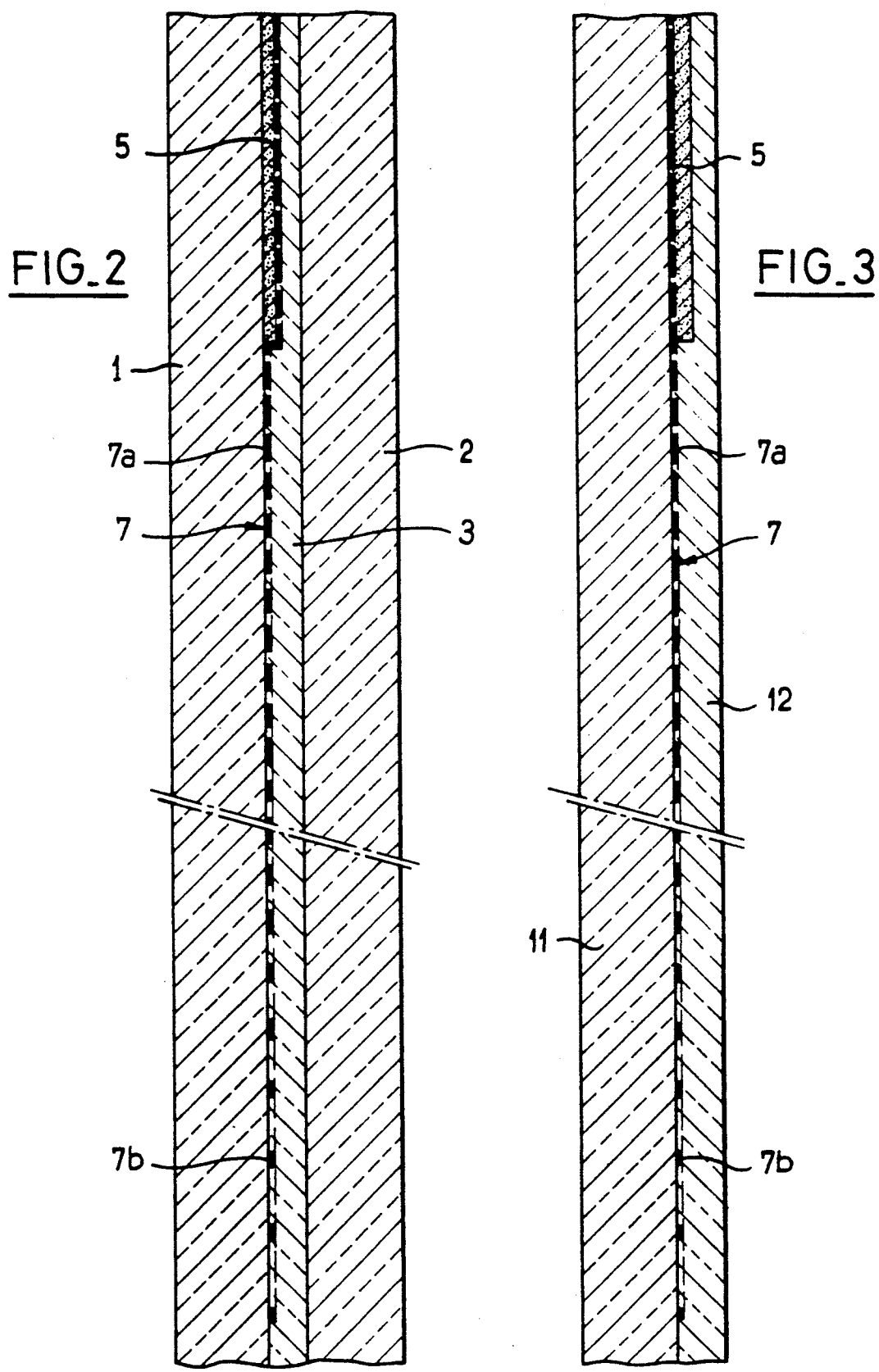

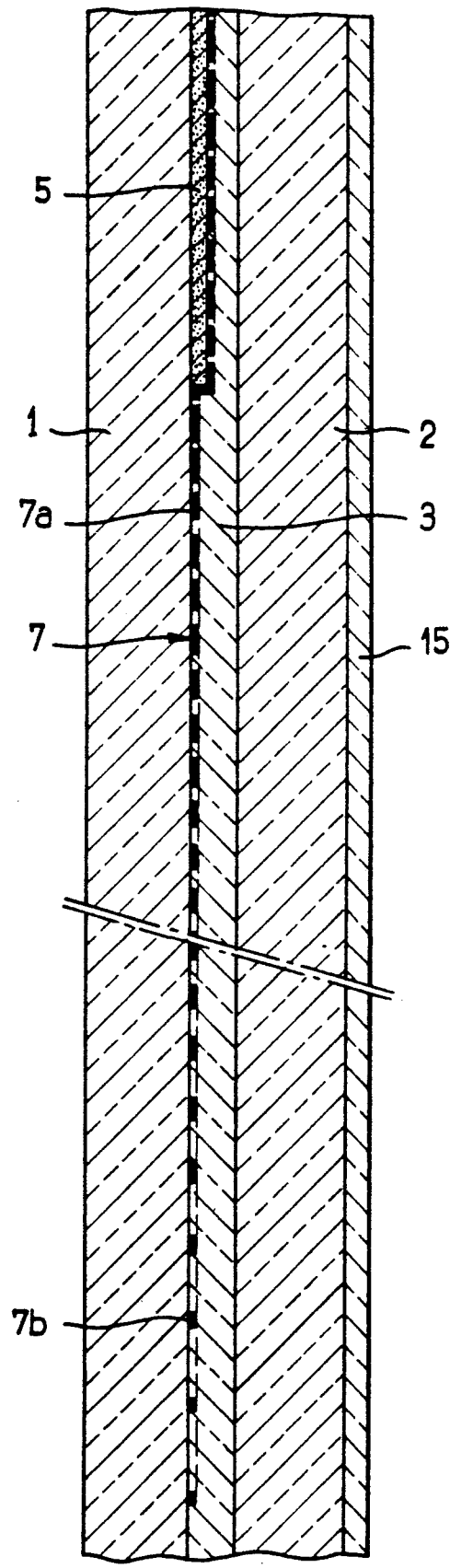
FIG_4

GLAZING WITH FILTERING BAND AND PROCESS FOR PRODUCTION

BACKGROUND OF THE INVENTION

1. Field of the Invention

This invention relates to a monolithic or laminated glazing for motor vehicles, exhibiting at least one filtering zone for attenuating light radiation and heat radiation.

2. Background of the Related Art

Glazings, and in particular windshields having at least one filtering zone, for example a filtering band in the upper part, are known in various forms.

Laminated windshields generally consist of two glass sheets and an inserted thermoplastic sheet of polyvinyl butyral, tinted in its upper part with organic coloring agents. One of the drawbacks of this type of windshield is that the organic coloring agents have a low light resistance, so that the tinted areas of the polyvinyl butyral sheet fade in time under the effect of the light.

In the case of another type of known windshield, as described, for example, in DE-OS 1 596 919, the glass sheet constituting the glazing is provided with a filtering layer with a metal oxide base, the production of this filtering layer being performed by application on the glazing of a solution of inorganic metal compounds which are oxidized into coloring metal oxides at higher temperatures. The solution containing the metal compounds is sprayed on the surface of the glass and pyrolysis takes place during a subsequent heat treatment. The spraying process makes it possible to apply only with difficulty a thin and uniform layer in a reproducible manner, so that this process is not suitable for an industrial production.

Other known windshields, for example that disclosed in DE-OS 1 951 616, use a filtering band made with an inorganic bakable enamel which is printed by silk-screening on the surface of the glass and which then is baked. The bakable enamel in this case consists of a glass with a low melting point and of colored pigments of metal oxides dispersed in the glass. The bakable enamel can have a transparency of 0 to 40%. The bakable enamel is printed according to such a screen that the transmission of the light gradually increases from the edge up to the zone of vision. Such filtering bands with a bakable enamel base of the glaze type also exhibit various drawbacks. The bakable enamels of the glaze type always have, for example, a certain characteristic cloudiness and form a rough surface, so that they do not make it possible to obtain clear transparent layers. Moreover, it is known that the solidity of the glass is reduced by the layers of the glaze type, which proves troublesome since the filtering bands cover a relatively large surface of the glazing.

SUMMARY OF THE INVENTION

The invention has as an object to obtain a glazing with at least one filtering zone, able to be produced industrially and in a reproducible way.

The glazing according to the invention is formed from at least one glass sheet equipped with at least one filtering zone, in particular in its upper part, in the form of a filtering band, formed from a transparent coating of a bakable enamel containing at least one noble metal in colloidal dispersion, said coating being applied by silk-screening, having a constant thickness and exhibiting on its entire surface a geometrically exact screening, the degree of coverage of the screen in the area close to the edge being 85 to 95%.

It has been proven, according to the invention, that the coating forming the filtering zone containing a noble metal present in colloidal dispersion, i.e., the coating of an enamel called a gloss, has the necessary filtering properties.

Moreover, the type of application of the coating forming the filtering zone and the geometric structure of this coating are particularly important. It is known that the exterior appearance of glosses, because of their very small thickness, greatly depends on such thickness. When the thickness of the layer varies, as is necessarily the case when the coating is applied by spraying or immersion, at least in the area of the transition to the uncovered or slightly covered zone of vision, it inevitably produces optical interference and iridescence. This is prevented according to the invention by a process of silk-screening which guarantees obtaining a constant layer thickness. The desired tinted effect when it involves a filtering band, i.e., where the transparency increases in the direction towards the zone of vision, is obtained only by the reduction of the degree of coverage by application of a geometrically exact screening. The particularly good outside appearance of the zone, and in particular of the filtering band, is due to the fact that there is no large continuous printed surface, but a screen geometric structure in which the degree of coverage reaches, in the most dense area, i.e., in the area close to the edge, at the very most about 95%, and preferably about 90%. In this area, a screen of holes is used which exhibits a close uniform distribution of small holes; in the area of the transition to the zone of vision, the holes of the screen become increasingly larger. Finally, the holes merge in the direction of zone vision to form a screen of dots in which the dots become increasingly smaller. As a variant, a screen formed only of dots also can be chosen, in which the size of the dots gradually increases from the central zone to the edge of the glazing until, in the vicinity of this edge, the dots touch one another and partially overlap one another. The geometric shape of the holes or the dots can be greatly varied.

When the degree of coverage is high, screens with holes in which the holes exhibit a diameter of 0.2 mm to 0.5 mm have proven satisfactory. For a degree of coverage of 85%, the spaces between the centers of the holes are 0.46 mm for a hole diameter of 0.2 mm and 1.15 mm for a hole diameter of 0.5 mm. For a degree of coverage of 95%, the spaces between the holes are about 0.8 mm for a hole diameter of 0.2 mm, and about 2 mm for a hole diameter of 0.5 mm.

In the area with high coverage density, i.e. in the area close to the edge, in which the degree of coverage reaches 85 to 95%, a screen of holes preferably is printed such that the holes exhibit a diameter of 0.3 to 0.4 mm and spaces of 0.7 to 1.6 mm. In the area with low coverage density, i.e. in the area of transition between the filtering band and the zone of vision itself of the windshield, the printed screen is, preferably, a screen of dots in which the dots exhibit a diameter of 0.3 to 0.4 mm and spaces of 0.7 to 1.6 mm. In the area with decreasing optical density, i.e. in the intermediate area between the area with high optical density and the area of transition, the sizes of the dots or the holes of the screens and their reciprocal spaces vary to the extent necessary to produce the desired tinted effect of the filtering band.

The glosses known, for example from patent publication GB 925 171, which are particularly suitable for the process according to the invention, contain in their composition suitable for printing, in addition to noble metals present in colloidal dispersion, metal salts which, during baking, form metal oxides by pyrolysis. These metal oxides essentially contribute to the formation of layers and to the improvement of the adherence of particles of noble metals.

According to an advantageous development of the invention, the glazing is provided with two filtering zones, in particular two filtering bands, the lower area of the glazing and in particular of the windshield also being provided with a filtering band which has the same properties as the upper filtering band and which is printed at the same time as the upper filtering band. By this filtering band placed in the lower area of the windshield, an appreciable reduction, for example, of the glare effect due to the solar rays reflected by the engine hood and the headlights of vehicles coming from the opposite direction can be obtained. Further, this lower filtering band clearly contributes to an improvement of the air conditioning of the passenger compartment of the vehicles.

According to another development of the invention, the filtering zone essentially covers the entire surface of the glazing with the desired tinted effects.

In one of the aspects of the invention, the glazing exhibits at least two layers, namely at least one outside silicate glass sheet and at least one plastic layer, in particular a layer having energy-absorbing properties or a layer having such surface properties as resistance to scratching and abrasion, or also a layer having energy-absorbing properties covered by a layer having surface properties. The plastic layer also can be an interlayer between two glass sheets.

The fact that the coating forming the filtering band is covered by a plastic layer constitutes an advantageous characteristic of the invention. Since the gloss enamel layers, which constitute the filtering band, have a particularly sensitive surface, the risk that the layer forming the filtering band will, over time, show troublesome optical disturbances by modification of its surface is eliminated. It is found, moreover, that the adhesive power of the plastic layer in the location of the filtering zone is not appreciably reduced.

According to an embodiment of the glazing comprising a filtering band, the latter further comprises a frame-forming marginal band of an opaque bakable enamel, placed on the outside glass sheet, on the side adjacent to the plastic layer, along the edge of the glass sheet. In this embodiment, the filtering band and the enamel frame overlap one another at least in the upper area of the glazing.

A glazing, in particular a windshield exhibiting this structure, can be produced with ordinary production methods. It has the necessary adherence of individual layers in the marginal area and can be mounted without difficulty by the gluing process in the window frames of the body. It has been proven that the coating forming the filtering band can be applied to the frame-forming coating of opaque bakable enamel which is used to prevent the view of the adhesive bead located behind the windshield in the mounted state and, further, to protect the adhesive material from the effects of ultraviolet rays. Although, in the case of the opaque frame-forming coating as in that of the coating forming the filtering band, it involves a bakable enamel and these two enamels exhibit entirely different compositions and properties, it has been proven that the two layers can be applied without difficulty to one another and can be baked together in a single heat treatment process.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIGS. 1, 1a, 1b are, respectively, perspective and detail views of a windshield according to the invention, formed from a laminated glazing comprising two silicate glass sheets and a plastic interlayer;

FIG. 2 is a section through II—II in FIG. 1; and

FIG. 3 corresponds to FIG. 2 but illustrates a windshield formed from a single silicate glass sheet and a plastic layer which is joined to it, and FIG. 4 corresponds to FIG. 2 but illustrates another windshield formed from a laminated glazing and an additional nonshattering layer.

DETAILED DESCRIPTION OF THE PREFERRED EMBODIMENTS

The embodiment shown in FIG. 1 and FIG. 2 shows a conventional laminated glazing comprising an outside silicate glass sheet 1 and an inside silicate glass sheet 2 which, when the windshield is in place on the vehicle, is oriented toward the passenger compartment, as well as an energy-absorbing thermoplastic interlayer 3, for example of polyvinyl butyral.

On the surface of outside glass sheet 1 turned toward interlayer 3, a frame-forming marginal band 5 of an opaque bakable enamel is placed along the edge of the windshield. The layer thickness of this marginal band is about 5 to 30 micrometers. This bakable enamel is preferably an enamel with a low melting point made from a basic glass whose melting point is about 580° C. and colored pigmentary heavy metal oxides incorporated in the basic glass. Bakable enamels of this type are well known and available on the market. They are printed on glass sheet 1 by a silk-screening process.

Coating 7 forming the filtering band is placed on the same surface of glass sheet 1 as that which carries marginal band 5. Coating 7 is located in the marginal area of the glass sheet on the enamel layer forming marginal band 5. It has a layer thickness of about 100 to 300 nm and consists of a bakable enamel called a gloss, i.e. a transparent enamel layer whose coloring effect is due to the presence of noble metals in colloidal dispersion. By way of noble metals, in particular gold, silver, platinum and palladium can be used, the adherence of the noble metals being improved by the fact that the coating contains metal oxides, such as, for example, bismuth oxide. The coating is formed with the desired coloring properties during the baking by pyrolysis of metal salts with resin acids, which are brought to a viscosity suitable for deposit by such essential oils as lavender oil. Suitable compositions for forming the gloss are described, for example, in patent publication GB 925 171. The deposit of the coating forming filtering band 7 is also performed by silkscreening.

Although the coating forming filtering band 7 has a high transparency, it does not comprise a continuous, i.e. uninterrupted, coating, but a regularly screened coating which is interrupted according to a regular arrangement. In the area exhibiting the highest optical density, i.e. in area 7a of the coating which is close to marginal band 5, the degree of coverage of the surface ranges from 85 to 95% and is, preferably, about 90% This degree of coverage is reached by a suitable screen of holes. To reach a degree of coverage of 90%, in the case of a hole diameter of 0.3 mm, the distance from center to center between two holes is 0.85 mm. Due to this screen of holes, the drawbacks normally observed in the case of enamels of the gloss type, namely an iridescence of the coating and the disturbing influence of point homogeneity defects such as dust particles which come into contact with the coating before the baking of the gloss, are unexpectedly prevented, and a uniform and clear optical appearance of the filtering band in transparency as well as in reflection is obtained.

In area 7b of the coating forming the filtering band which is close to the zone of vision of the windshield, in which a continuous transition of the filtering band is formed with an increasing transparency, the degree of coverage is continuously reduced, and, in end section 7b, reaches only about 5%, due to the fact that the gloss is printed here only in the form of fine dots. In the end section of this area, the dots exhibit, for example, a diameter of 0.35 mm and are spaced by 3 mm.

After the printing of marginal band 5, the printed enamel is hardened by subjecting it, according to its composition, to a treatment of infrared radiation or to an ultraviolet radiation. On the enamel thus hardened and the surface area of the glazing thereunder, the composition of gloss prepared for the silk-screening then is applied in a screened way. The printed gloss then is subjected to a suitable drying process, then the two enamel layers are baked together at the temperature of about 600° C., which is necessary for the bending of the glazings. Finally, two glass sheets 1 and 2 are subjected in the usual way to later treatments to produce the laminated glazing.

In the case of the windshield shown in FIG. 3, a safety windshield comprises a single silicate glass sheet 11 placed on the outer side of the vehicle and a plastic sheet 12 placed on the inner side of the vehicle. Plastic sheet 12 exhibits, on one hand, energy-absorbing properties and, on the other hand, a scratch-resistant surface. It can be formed from one or two layers of polyurethane. In this latter case, the plastic sheet comprises a layer with a polyurethane base exhibiting energy-absorbing properties and a layer of resilient coating with a thermosetting polyurethane base.

Safety glazings having this structure are known and are described, for example, in European patent publications 0 131 523 and 1 132 198.

In the case shown in FIG. 3, coating 7 forming the filtering band, which is made from a gloss type bakable enamel, is initially placed on glass sheet 11. The composition of the bakable enamel of the gloss type, as well as the arrangement and the production of coating 7, correspond to the embodiment described in relation to FIG. 1. Coating 7 forming the filtering band again exhibits an optically dense area 7a and a transition area 7b in which, by the selection of a suitable screen, the degree of coverage is reduced. Frame-forming marginal band 5 in this case is printed on coating 7 which, after the printing operation, is first subjected to a drying process. The baking of two layers 7 and 5 also is performed in this case during a common baking operation. In a variant, it is possible to print frame 5 first, then coating 7.

Another embodiment of a windshield according to the invention is illustrated in FIG. 4. In this case, such a laminated glazing as has been described in detail in connection with FIG. 1 is further provided with a non-shattering sheet or layer 15, for example of a highly elastic polyurethane with three-dimensional crosslinking having resilient and antilaceration properties. Suitable polyurethane layers are described, for example, in French patent publications 2 398 606 and 2 574 396.

The arrangement and the configuration of coating 7 forming the filtering band and of marginal band 5 correspond to the embodiment described in connection with FIG. 1.

Obviously, numerous modifications and variations and variations of the present invention are possible in light of the above teachings. It is therefore to be understood that within the scope of the appended claims, the invention may be practiced otherwise than as specifically described herein.

What is claimed as new and desired to be secured by Letters patent of the United States is:

1. A glazing for a motor vehicle windshield, comprising:
   at least one glass sheet; and
   a constant thickness transparent coating forming a filtering zone on a surface of said glass sheet, said coating comprising a bakable enamel containing at least one noble metal in colloidal dispersion, said coating being applied by silk screening and having, over its entire surface, a geometrically exact screening pattern, wherein said screening pattern has a degree of coverage of between 85% and 95% adjacent an edge of said glass sheet.

2. The glazing of claim 1 wherein said, filtering zone is positioned at an upper part of said glass sheet.

3. The glazing of claim 1 wherein said coating has a thickness of between 100 and 300 nanometers.

4. The glazing of claim 1 wherein said coating includes at least one metal oxide formed by pyrolysis during baking of said coating.

5. The glazing of claim 4 wherein said metal oxide comprises bismuth oxide.

6. The glazing of claim 1 wherein said screening pattern adjacent said edge of said glass sheet comprises holes having a diameter of 0.2 mm to 0.5 mm and spaced by 0.5 mm to 2 mm.

7. The glazing of claim 6 wherein said screening pattern comprises, at a lower part of said glass sheet, dots having a diameter of 0.2 mm to 0.5 mm and spaced by 0.5 mm to 2 mm.

8. The glazing of claim 2 wherein said filtering zone is also positioned at a lower part of said glass sheet.

9. The glazing of claim 1 including a plastic layer applied onto the glass sheet and covering said coating.

10. The glazing of claim 9 wherein said plastic layer has energy absorbing properties.

11. The glazing of claim 10 wherein said plastic layer comprises a sheet of one of the group consisting of polyvinyl butyral and polyurethane.

12. The glazing of claim 9 including an outside glass sheet, wherein a surface of the outside glass sheet overlying said at least one glass sheet and said plastic layer has, along an edge thereof, a marginal band of an opaque bakable enamel overlapping said filtering zone.

13. The glazing of claim 12 wherein said marginal band has a thickness of 5 to 30 micrometers.

14. The glazing of claim 9 wherein said plastic layer is an interior layer facing the interior of the vehicle.

15. The glazing of claim 14 wherein said plastic layer is formed of a layer having a polyurethane base with energy absorbing properties, and a layer of a resilient coating having a thermosetting polyurethane base.

* * * * *